Figure 1:
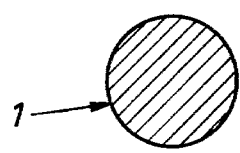

United States Patent [19]

Gundlach

[11] 4,250,702

[45] Feb. 17, 1981

[54] MULTIFILAMENT THREAD AND METHOD OF FORMING SAME

[75] Inventor: Rudolf Gundlach, Lichtenau, Fed. Rep. of Germany

[73] Assignee: Frohlich & Wolff GmbH, Hess.-Lichtenau, Fed. Rep. of Germany

[21] Appl. No.: 31,295

[22] Filed: Apr. 18, 1979

[30] Foreign Application Priority Data

Apr. 27, 1978 [DE] Fed. Rep. of Germany ....... 2818386

[51] Int. Cl.³ .......................... D02G 3/36; D02G 3/40
[52] U.S. Cl. ................................... 57/251; 57/297
[58] Field of Search ................. 57/223, 250, 251, 295, 57/296, 297; 118/33, 44, 78

[56] References Cited

U.S. PATENT DOCUMENTS

| 3,395,529 | 8/1968 | Ray | 57/297 X |
|---|---|---|---|
| 3,498,038 | 3/1970 | Shulver | 57/297 X |
| 3,779,844 | 12/1973 | Dorsch | 118/44 X |
| 3,823,031 | 7/1974 | Tsukamoto et al. | 57/251 X |
| 3,885,380 | 5/1975 | Hacker | 57/223 X |
| 3,972,304 | 8/1976 | Boucher | 57/296 X |
| 4,120,146 | 10/1978 | Robin | 57/297 |

Primary Examiner—Donald Watkins
Attorney, Agent, or Firm—Miller & Prestia

[57] ABSTRACT

A flexible thread consisting of filaments held together by twisting, which thread is made of a polymer base material wherein all of the individual filaments of the thread are encased in a synthetic resin and embedded therein so that adjacent filaments are intimately bonded to one another, the synthetic resin being in partially cured state, chemically stable at room temperature, the resin being fully curable by heating; the thread can, therefore, be woven into a mesh before final curing to harden the thread.

29 Claims, 12 Drawing Figures 9  10  15  18  23  27  29

33  50  44  48  50'  44  58  67  50"  61

61  70  71  72

MULTIFILAMENT THREAD AND METHOD OF FORMING SAME

The invention relates to a multifilament thread consisting of filaments held together by twisting, which filaments are made of polymer material and which thread is coated with a synthetic resin.

Meshes, fabrics and felt combinations are used in the drying zone of a papermaking machine and must ensure troublefree transportation and an optimum drainage effect of a paper web. These meshes are made to measure, suited to the particular dimensions of the papermaking machine. Making to measure demands extremely high standards from the thread employed, in respect of general uniformity, and specifically in respect of the length-elongation characteristics. Particular importance attaches to the features of stiffness and dimensional stability of the threads running transversely to the machine direction, whilst on the other hand the lengthwise threads (in the direction of travel of the wire) should be distinguished by dimensional stability and flexibility. Resistance to hydrolysis on exposure to superheated steam at atmospheric pressure, to which the meshes in the drying section of the papermaking machine are constantly exposed during operation, and passive, and where necessary also active, soil repellancy are amongst the properties which substantially influence the operating ability and working life of the drying meshes. Apart from the fact that because of being individually made to measure the meshes are expensive, the stoppages of high output papermaking machines resulting from mesh defects additionally cause substantial costs. The demands made of the thread material of the drying meshes have risen to an exceptional degree in respect of purpose-oriented chemical-technological and physical properties. The threads from which meshes and mesh felt combinations for the drying sections of papermaking machines are nowadays manufactured are in the main drawn or spun from polymeric substances, and the base yarn or thread is either raw or is finished with synthetic resins. Mesh fabrics made from raw threads are also treated, in the form of sheet-like structures, with synthetic resins. However, it has been found that the threads which have already been treated with synthetic resins before the manufacture of the wire make it possible to achieve a qualitatively better drying mesh which also gives higher productivity.

The threads manufactured and finished in the conventional manner can be classified in three groups in accordance with their schematic cross-sectional appearance, namely;
Group 1: Monofilaments (FIG. 1)
Group 2; Raw multifilaments (FIG. 2)
Group 3; Multifilaments with synthetic resin applied by a dipping process (FIG. 3).
Group 4: Multifilaments with a thermoplastic covering applied by extrusion (FIG. 4)

The thread material shown in FIG. 1 is employed with diameters of up to 0.5 mm. However, the polyester monofilaments, which are known to be dimensionally stable, do not yet possess any special protection against hydrolysis, in spite of specific improvements in the polymeric substance, so that the dreaded fibrillation effect is a shortcoming which must be accepted. In contrast, polyamide multifilaments are more resistant to hydrolysis but are unsatisfactory in respect of dimensional stability.

Figure 2:
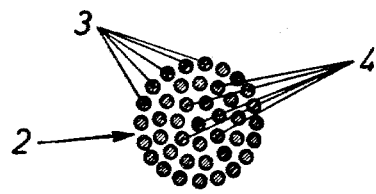
Figure 3:
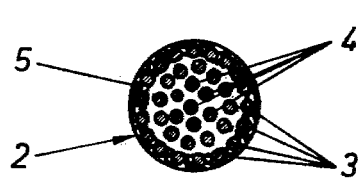
Figure 4:
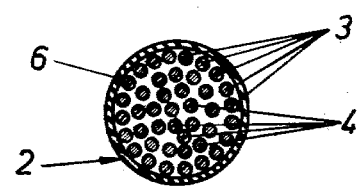

According to FIGS. 2 and 3, multifilaments are also employed as a starting material for the manufacture of meshes, because of the crosslinking of the applied synthetic resin with the outer filaments of the thread.

British Registered Design 1,958,017 shows, for example, a mesh fabric of polyester yarn encased in synthetic resin. The invention starts from this prior art.

Advantageous aspects of such a multifilament threads are the good stability of shape or dimensional stability of the polyester coupled with the synthetic resin stiffening, which at the same time acts as protection against hydrolysis, but causes the thread core (see FIG. 3) to remain raw, so that it suffers more rapid hydrolytic degradation with increasing mechanical wear of the synthetic resin covering. Synthetic resin-covered multifilament threads, which compared with monofilament threads are thicker and have a higher tensile strength, as a rule give a dimensionally stable mesh with a smaller number of threads, so that the weaving process becomes more economical. Furthermore, the necessarily more open mesh also favours the rate of evaporation. On the other hand, the stiffness of these conventional threads presents processing problems during bobbin-winding and weaving. Accordingly, even polyamide multifilament threads which are more resistant to hydrolysis by virtue of the nature of the polymeric substance, and the Dralon multifilaments which are distinguished by even better hydrolysis resistance, can only be employed with certain limitations, to which of course the poor stability of shape or dimensional stability, which is specific to the material, also contributes, very particularly in the case of Dralon multifilament threads.

As shown in FIG. 4, a thread is known in which raw multifilament polyester thread is surrounded by a plastics covering in the manner of a sleeve, without the covering being intimately bonded to the multifilament core. The covering can be pulled off mechanically. The stiffening is low in spite of a quantitatively high proportion of thermoplastic covering for which reason a dimensionally stable mesh cannot be expected from this thread material alone. Furthermore, should the cover become damaged, the core, which comprises polyester multifilaments and is prone to hydrolysis, is directly exposed to the moist heat in the drying section, for which reason local hydrolytic degradation takes place relatively rapidly.

Amongst the previously described known threads for drying meshes there are none which do not exhibit at least one important negative characteristic in respect of their use properties in a drying wire.

It is an object of the present invention to provide an improved multifilament thread which does not exhibit the disadvantages of the prior art threads.

In accordance with the present invention, there is provided a flexible thread consisting of filaments held together by twisting, which thread is made of a polymer base material wherein all of the individual filaments of the thread are encased in a synthetic resin and embedded therein so that adjacent filaments are intimately bonded to one another, the synthetic resin being in partially cured state, chemically stable at room temperature, the resin being fully curable by heating.

Accordingly, the invention departs from the known surface treatment of the thread and provides a thread in which the resin reaches the core of the thread. As a result, the core region of the thread can be made relatively hard or flexible depending on the resin used. If a polyester filament is employed, the resin may serve to protect the polyester from hydrolysis at the core.

The synthetic resin, preferably, is curable on heating (by incorporation of a catalyst or curing agent) at 160° to 210° C. This makes it possible initially to produce the thread in a flexible form suitable for processing, so that it can be wound on bobbins even with a small radius and so that it can be handled during weaving without resulting in breaks and kinks or other permanent deformations of the thread. Only on treatment at a temperature substantially above room temperatures, say in the region from 160° to 210° C., can the thread be cured so that it acquires substantial stiffness and dimensional stability so as to perform its functions in a manner which take into account the conditions to which it is exposed, for example as a mesh fabric. The final curing temperature is also separated by a distinct interval from the evaporation temperature of the solvent for the resin. No hardening of the thread takes place at room temperature.

It is particularly advantageous if the resin consists of an unmodified epoxy resin mixed with a plasticised epoxy resin and a hot-curing catalyst. The two epoxy resins have the advantage that they can be employed together in any mixing ratio, which can be chosen at will in accordance with the desired further processing properties of the thread. In the case of a particularly flexible thread, a higher proportion of plasticized resin is employed than in the case of a thread which is required to exhibit a certain hardness already in the state in which it is processed further. The catalyst can be modified dicyandiamide or a boron trifluoride/monoethylamine complex.

The structure of the synthetic resin, viewed radially from the centre of the core to the periphery of the thread, can also be predetermined. Thus it is possible to have a proportion of synthetic resin which quantitatively increases from the thread core outwards, or a proportion of synthetic resin which is specifically qualitatively oriented from the thread core outwards, which in conjunction with the polymeric synthetic multifilaments results in a soft flexible thread having particularly advantageous processing characteristics, which thread does not change its condition on ambient storage and only cures on exposure to elevated temperatures, the resulting degree of stiffness depending on the particular predetermined characteristics. In order to increase the flexibility and permanent elasticity of the thread, the synthetic resin can contain a high proportion of internally plasticised epoxy resin. It is also possible additionally to cover the compact entire thread with a layer of synthetic resin. The covering can determine the strength of the thread, which is required for further processing, whilst the thread core is relatively soft and flexible and is only fully cured after further processing.

The synthetic resin and the filament material are matched to one another. The filament material of the thread may consist of polyester, polyamide, polyacrylonitrile, aramide, glass or the like, alone or in a mixture e.g., of polyester with polyacrylonitrile or polyester with nylon and polyacrylonitrile.

As a result of the construction, according to the invention, of the new thread, the processability during the bobbin-winding and weaving process is better compared to that of conventional thread material, and this has an effect on the mesh quality as a result of optimised precision, and also reduces waste. This is associated with substantial cost savings. Furthermore, certain structural effects in the mesh fabric can be achieved if, for example the lengthwise thread is woven in an already fully cured or substantially cured state, whilst the weft is introduced as a soft thread which is only subsequently cured in the mesh. the converse use of the threads is also possible. The flexible thread has a further substantial advantage. It does not eliminate any volatile substances during the heat aftertreatment and thus does not pollute the environment in the subsequent processing stages, in contrast to known threads finished with phenolic resin. It is clear that the adhesion of the resin to the filaments is excellent because the combination is present throughout the thread. This is the basis of optimum protection of the thread when exposed to mechanical stress, as well as of dimensional heat stability and of resistance to chemicals, solvents and water. Of course, the embedding of the individual filaments in the thread results in the case of polyester multifilaments, in excellent protection against hydrolytic degradation in moist heat, for example in the medium resulting from evaporation on a papermaking machine. Polyester filaments possess stability of shape, and dimensional stability, which are specific to the material and which are further optimised by the thread treated according to the invention.

A process according to the invention for the manufacture of such a thread from polymer filaments, which thread is dipped in a synthetic resin is characterised in that in order to impregnate the thread with synthetic resin solution as far as possible into the thread core, the thread is dipped, with little tension, and then with alternate pushing and pulling, and that after evaporation (full or partial) of the solvent, the synthetic resin is partially cured and is thereby bonded to the filaments. In this context it is important, firstly, that the thread should be passed through the dipping bath under little tension, so that the individual filaments located on the surface leave appropriate gaps between them, through which the synthetic resin solution can penetrate into the thread core. This treatment is followed by alternate pushing and pulling of the thread in the dipping bath, somewhat comparable to the accelerated impregnation of a sponge with water by compressing the sponge material and then allowing it to spring back automatically. During the pushing, the synthetic resin solution is uniformly sucked into the thread core. After evaporation of the solvent, the synthetic resin is partially cured. The degree of curing depends on the desired further processing characteristics of the thread.

Before dipping, the filaments are loosened. This can be effected by repeatedly bending the thread in a bending unit. This process step is particularly important if the raw thread has been brought, by a prior thermal treatment, to a reproducible starting condition with corresponding starting properties. In order to orient the force-elongation properties and decide the heat-shrinkage properties, it is thus possible to carry out, prior to dipping, a heat treatment of the raw thread at temperatures of about 180° to 250° C., during which the raw thread is also stretched, shrunk or kept at the initial length, depending on the different properties of the raw thread material as supplied. Furthermore, it is important that the raw thread treated in this way should be cooled approximately to room temperature before dipping, so that polymerisation should not occur immediately in the dipping bath. After such a heat treatment and before dipping, the raw thread is subjected to several changes in direction, that is to say it is bent and opened up, especially in the surface region. This prepares the raw thread for impregnation in the dipping bath.

It is particularly advantageous to lead the raw thread, which has been impregnated as far as the thread core, vertically out of the dipping bath, so that irregularities in impregnation with the synthetic resin solution can still level out as a result of running-together. This effect manifests itself particularly in the gravitational direction.

After leaving the dipping bath, the impregnated raw thread is dried until the solvent has completely evaporated, this drying of course being carried out at a lower temperature than that corresponding to curing. For drying, temperatures of about 80° to 150° C. can be used. The object of this process step is to ensure that the thread is dressed with a proportion of resin which, both quantitatively and qualitatively, is very uniform from the inside to the outside of the thread.

However, it is also possible to use a method wherein the impregnated raw thread, after leaving the dipping bath, is only partially dried, with partial evaporation of the solvent, and is subsequently passed through a further dipping bath containing a resin solution of thicker consistency or containing a different resin/catalyst combination, after which the thread is dried until the solvent has completely evaporated. In this case, the partial evaporation of the solvent first takes place at about 120° to 140° C. This is followed by the second dipping process. The total evaporation of the solvent can then be carried out at 80° to 150° C. The object of this process step is to dress the thread with a proportion of resin which quantitatively increases from the inside to the outside, and/or to dress it with a qualitatively oriented resin component.

It is particularly advantageous to carry out any subsequent partial curing of the synthetic resin under increased thread tension. This achieves intimate bonding to the filaments during the partial curing of the resin, so that a soft supple thread is produced, which is easy to process and which can be cured in a subsequent heat-treatment process, so as to acquire its final properties.

A further variant consists of a method wherein between the first and second dipping process of the raw thread a partial curing of the synthetic resin takes place and that after the second dipping process a complete curing of the resin coating applied in the second dipping bath, and possessing a plasticised permanently elastic character, takes place. This achieves a dressing of the core of the thread, which is only fully cured, during a subsequent heat treatment, whilst the thread material is easily processed further because of the soft thread core and, as a result of the already cured but flexible, permanently elastic coating acquires surface protection against mechanical stress during processing, which protection of course also still manifests itself advantageously in the case of the finished product. The converse of this variant is also possible; in this case, the plasticised flexible permanently elastic epoxy resin is introduced into the thread core and the outer film is made hard but flexible. This, in conjunction with the filaments of the thread, improves the damping properties and hence the compressibility of the mesh felt combination which travels under pressure in a papermaking machine.

The invention is further illustrated and described with the aid of the drawings. In these;

FIG. 1 shows a cross-section through a monofilament (prior art)

Figure 5:
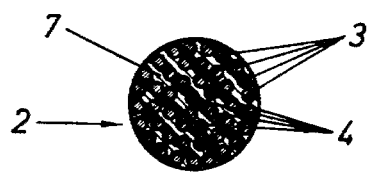
Figure 6:
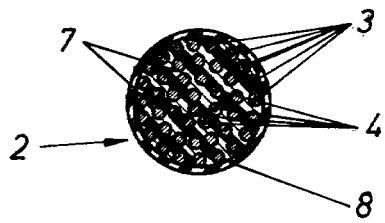
Figure 7A:
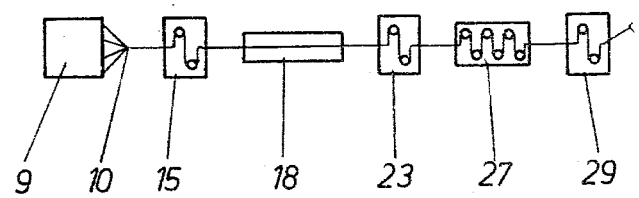
Figure 8:
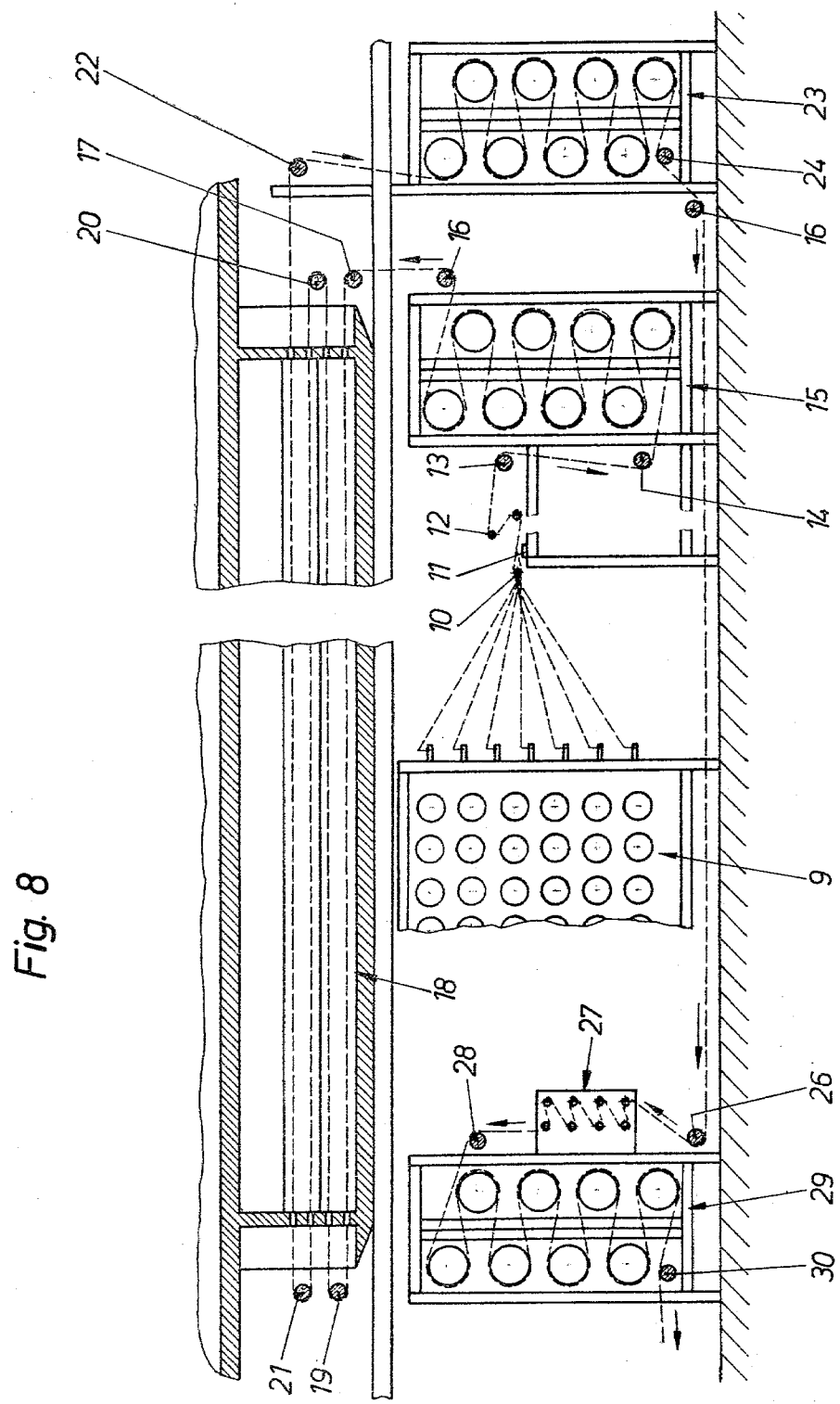
Figure 9:
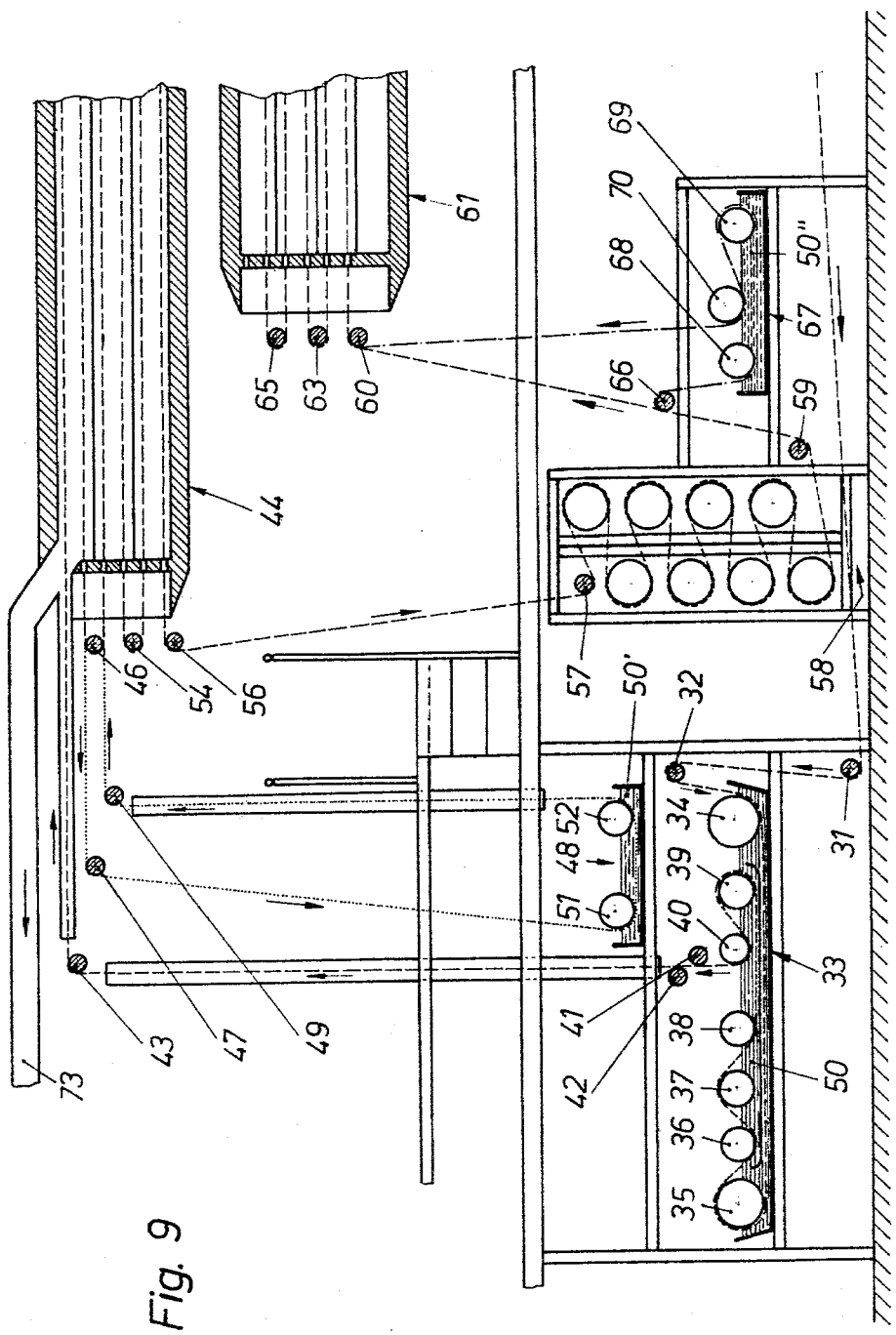
Figure 10:
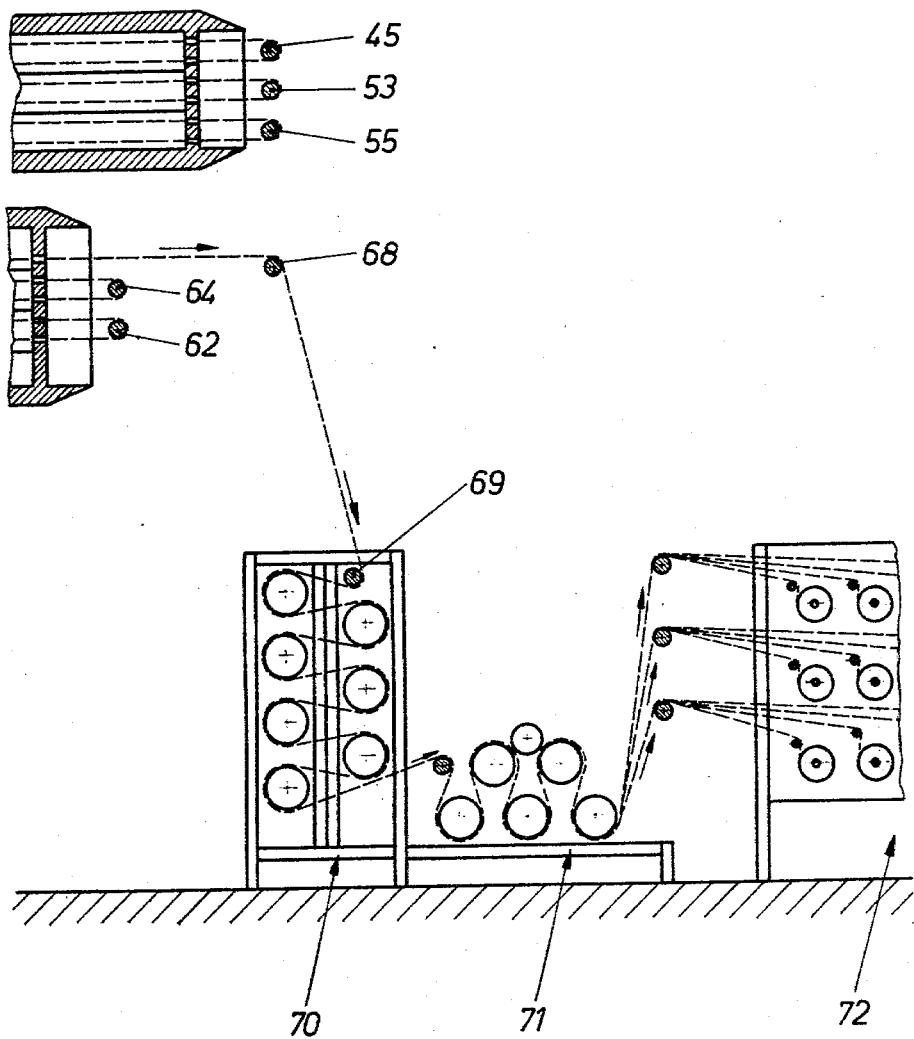

FIG. 2 shows a cross-section through a multifilament in the form of the raw thread (prior art), FIG. 3 shows a cross-section through a multifilament with synthetic resin applied by a dipping process (prior art), FIG. 4 shows a cross-section through a multifilament with an extruded thermoplastic synthetic resin covering (prior art), FIG. 5 shows a cross-section through the thread according to the invention, completely dressed with synthetic resin, FIG. 6 shows a cross-section through the thread according to the invention, in a further embodiment with an additionally specially formed synthetic resin outer covering FIGS. 7a, b and c show, in sequence a flow chart highlighting the principles of production of the thread in accordance with the invention, FIG. 8 shows a part of the installation for the production of reproducible initial properties of the thread, FIG. 9 shows the further part of the installation, with the dipping baths, and FIG. 10 shows the further part of the installation, at the end of the installation.

FIG. 1 shows a monofilament 1, that is to say a single thread of relatively large diameter, which as such is prior art. FIG. 2 shows a multifilament thread 2 consisting of a plurality of filaments 3 at the surface of the thread 2 and further similar filaments 4 in the core region of the thread. FIG. 2 shows the multifilament thread 2 in a completely untreated condition, that is to say the raw thread.

The multifilament thread 2 according to FIG. 2 can, according to FIG. 3, be provided, by a dipping process with an application of synthetic resin, 5, which however at best extends to the region of the filaments 3 on the outer surface of the thread 2, whilst the core region, that is to say the filaments 4, remain free from synthetic resin.

A further thread 2 of the prior art is shown in FIG. 4. In this case, an extruded thermoplastic synthetic resin covering 6 is applied to the filaments 3 and 4; this covering does not even form an intimate bond with the filaments 3 on the surface, and instead can be pulled off mechanically.

FIG. 5 shows the thread according to the invention, consisting of the multifilament thread 2 comprising the filaments 3 and 4. Between all of the filaments 3 and 4 there is synthetic resin 7, in which the individual filaments 3,4 are completely embedded and enclosed. The synthetic resin 7 is intimately bonded to the individual filaments 3 and 4.

FIG. 6 shows a further embodiment of the thread 2 according to the invention, which has an internal structure like that of FIG. 5 and, in addition to the synthetic resin 7 in the core, a synthetic resin covering 8 is applied externally, which covering may impart to the thread, in the region of the surface, a different property to that aimed at in the core region by using the synthetic resin 7.

Figure 7B:
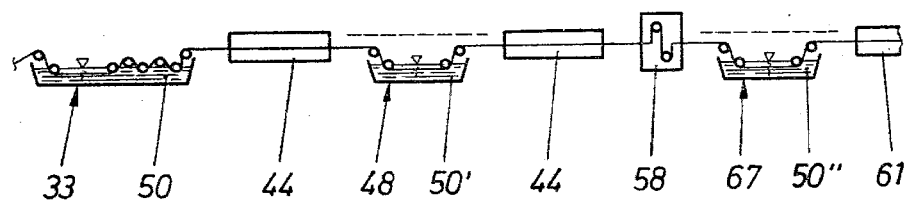
Figure 7C:
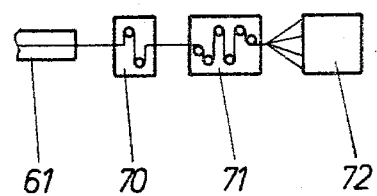

The process for the production of the thread according to the invention is explained in detail, in relation to FIGS. 7 to 10, of which FIGS. 7a, b, c show sketches, in sequence summarising the principle of the entire process and the installation employed for the process, whilst FIGS. 8, 9 and 10 are each to be regarded as successively adjoining one another and show three parts of the installation according to FIG. 7.

The raw polyester filaments which run off the creel 9 are formed, by means of a guide rod 10 and a guide rail 11 into a bundle of aligned filaments. This filaments bundle passes a tensioning beam 12, guide rollers 13 and 14, a group of rollers forming a stretching unit 15, and a guide roller 16, and is fed via a guide roller 17 into a heating tunnel 18, through which the filament bundle travels back and forth over guide rollers 19, 20 and 21; thereafter the bundle is taken up, via a guide roller 22, by a further group of rollers forming a stretching unit 23. The speeds of the groups of rollers of the stretching units 15 and 23 are infinitely and independently variable, so that the length of thread between these groups of rollers can be longitudinally stretched, shrunk or kept at the initial length. Heating in the heating tunnel 18 is carried out at a high temperature, viz 180° to 250° C., (preferably 236° C., in the case of a polyester) to heat-set the filaments in the bundle, so that the bundle acquires stable force-elongation properties after cooling to room temperature. The resulting thread is 'after cooling' mechanically stressed, via guide rollers 24, 25, 26 in a thread-bending unit 27, which may consist of rotating and/or stationary shafts of about 30 mm diameter, so that any stiffening or mechanical sealing of the thread surface, resulting from the heating step, tensioning step or by spin-dip and possible other surface treatments is reduced; the thread is then taken up, via a guide roller 28, by a group of rollers forming another stretching unit 29. The thread 2, reproducibly prepared to this stage, is delivered via a guide roller 30. The raw thread pretreatment, in the section from the stretching unit 15 up to and including the stretching unit 29, which is integrated in the process of manufacture according to the invention, prepares the thread to an optimum starting condition for a synthetic resin finishing process. The thread passes, via guide rollers 31 and 32, under little tension, into a dipping bath 33 (FIGS. 7 and 9) contacting the resin. In the section of the dipping bath 33 into which the raw multifil thread 2 is introduced under little tension, the resin 50 penetrates, by capillary action, into the thread 2 between dipping rollers 34 and 35 in the bath, which is provided with automatic level regulation. After passing over the dipping rollers 35, the thread passes through a slalom zone, over which the rollers 36 to 40 are driven at infinitely variable speeds, the speeds differing, in accordance with the desired effect, both between one another and, as a group, from the speeds of the dipping rollers 34 and 35, so that the rollers exert a push-pull effect on the thread bundle. This construction of the dipping station 33 to 40 ensures optimum penetration of the resin 50 into the multifilament thread 2 as far as the thread core (compare FIG. 5). The thread leaves the dipping station 33 to 40 vertically upwardly via a roller 40, if necessary also with subsequent flanking contact with doctoring rollers 41 and 42 which can be pivoted onto, and away from, the thread. This arrangement results in even distribution of the resin in the thread. A guide roller 43 guides the thread into an evaporation tunnel 44, through which it passes, via guide rollers 45 and 46, to a guide roller 47, after which it passes through a dipping bath 48 possessing dipping rollers 51 and 52. In this bath the thread which is already impregnated with synthetic resin receives an additional surface application a resin, which may be the same as that in the dipping bath 33 to 40, or may be a different resin 50'. This resin 50', may be a modified thermally self-curing liquid epoxy resin; the thread is then passed, via a guide roller 49, into an evaporation tunnel 44 (or alternatively is passed, without a by-pass 47,48,49 from the guide roller 46 directly further through the evaporation tunnel 44) over subsequent guide rollers 53, 54 and 55 and as far as a guide roller 56, from where it continues via a guide roller 57 into a group of rollers forming a stretching unit 58. The last treatment zone, which now follows, incorporates guide rollers 59 and 60, and a heating tunnel 61 possessing guide rollers 62, 63, 64 65. Instead of being lead directly into the heating tunnel 61, the thread can be led from the guide roller 59 via a guide roller 66 into a further dipping bath 67, filled with a resin 50", via dipping rollers 68, 69 and 70, then to the guide roller 60 and from there into the heating tunnel 61. Any combination between the dipping baths 33, 48 and 67 is possible.

The thread then passes via guide rollers 68, 69 (FIGS. 7 and 10) to a further group of rollers (stretching unit 70). The group of rollers 71 ensures that the individual threads of the thread bundle are transferred, without slippage, to a bobbin-winding machine 72 for winding up the thread.

The speeds of the groups of rollers of the stretching units 29, 58, 70 and of the stretching units 15 and 23 are infinitely variable, independently of one another, within predetermined programmes, so that the thread bundle can forcibly be influenced in the longitudinal direction between any two groups of rollers, which can also, in general terms, be described as stretching units. As a result, the thread can, as in the dipping stations, be run under little tension in the solvent evaporation zone, so that the solvent can more readily escape from the thread core. The hot air flowing in metered amount into the evaporation tunnel 44 can be at a temperature of 80° to 160° C. For practical purposes, this air takes up the medium resulting from evaporation, and is fed, as a defined solvent vapour/air mixture, to a solvent recovery installation, which at the same time serves as a waste air installation, via the tunnel 73. In the heating stage, the resin/curing agent material present as a dressing on all individual filaments 3,4 forms a homogeneous bonding material in the multifilament thread 2, which in the subsequent stage, in the heating tunnel 61, at temperatures of 90° to 180° C. preferably 140° C., only partly polymerises to the stage that the final condition of the thread is still soft and flexible. A subsequent heat treatment of a mesh produced from these new threads, is required to complete polymerisation, this treatment being carried out at 170° to 210° C. depending on the construction and weight per unit area and depending on the heat-setting installation, including the temperature, residence time and nature of the heating medium (contact heat, convection heat or radiant heat). As a result of this curing, the final characteristics of the thread 2 develop and as a direct consequence determine the improved characteristics of the mesh.

In summary, of the continuous five-stage finishing process;

In the first stage, a longitudinal change of the raw thread bundle by exposure to a high temperature (180° to 250° C.) occurs. This has the purpose of bringing the force-elongation characteristics and the heat shrinkage characteristics to the technological requirements in the end product, for example the mesh. The second stage is cooling of the thread to room temperature and breaking-up of the stiffening effect produced in the heat-treated raw threads, as well as a loosening of the filaments in the thread and the introduction of the thread, under little tension, into the dipping station. This second stage serves the purpose of optimising the absorbency of the heat-pretreated threads. The third stage embraces the impregnation of the thread bundle with a synthetic resin solution by means of a two-stage dipping process with a capillary action stage and a push-pull stage, to bring about optimum impregnation of the thread with the resin. In the fourth stage, one alternative is that a partial evaporation of the solvent takes places in hot air at 120° to 150° C.; thereafter, a second dipping process in a solution of thicker consistency or with a different resin is carried out and thereafter the solvent is evaporated virtually completely in hot air, preferably at 80° to 160° C. This serves the purpose of producing the thread dressing with a proportion of resin which increases quantitatively from the inside outwards, and/or with a resin component which is qualitatively oriented. In the other alternative, the solvent can be fully evaporated in hot air at 80° to 160° C. on the direct path through the evaporation tunnel without an interposed second dipping process, in order to obtain a thread dressing with a resin content which, from the inside outwards, is homogeneous.

In the subsequent fifth stage, partial polymerisation by means of a short residence time in hot air at 80° to 160° C. under increased thread tension is effected. This process step serves the purpose of achieving incipient curing of the resin and bonding of the resin to the filaments which provides the strength, so that a soft supple thread, which is easily processable, is produced, which thread can be fully cured in a subsequent heat-treatment process, so as to acquire its final properties. A catalyst (or curing agent) is used which is effective only at high temperatures. Variants are also possible: a partial polymerisation of the resin which has penetrated into the thread in the first dipping process and encloses the individual fimaments, and which possesses the character of a thermosetting resin, is carried out, and at the same time complete polymerisation of a thermoplastic resin coating which is applied in the second dipping process, is effected. This is done with the object of providing a core which only undergoes complete polymerisation during a subsequent heat treatment of the mesh but which is surface-protected against mechanical stress, during processing until the final mesh is produced.

An inversion of this variant, in which the thermoplastic resin is introduced into the thread core and the outer film is thermosetting but flexible, improves the damping properties of the thread and hence the compressibility of a mesh/felt structure which travels under pressure in a papermaking machine.

In the process described above for the manufacture of a thread. A synthetic resin mixture of two liquid epoxy resins, of which one is unmodified and the other incorporates a plasticiser, has been found to be especially suitable. Both resins are 100% reactive and are miscible with one another in all ratios. In the lengthwise warp threads of the mesh, for example, the resin with the plasticiser should predominate, whilst in the weft threads the unmodified resin should predominate. As a result of this the mesh, in the cured state, remains suitably flexible in the machine direction, and has good dimensional stability, whilst in the transverse direction it becomes stiffer and markedly of stable shape. The liquid resins should be diluted with a suitable solvent so as to give a solids content of, preferably 30 to 40%. However, solutions with a solids content of 5 to 60% can also be used. Admittedly, numerous conventional solvents were found to dissolve the synthetic resins, but failed to dissolve the hot-curing agent present as a crystalline powder. Only one solvent was found which satisfactorily dissolved both all the suitable epoxy resins and the hot-curing agent, which agent is for example, a modified dicyandiamide or boron trifluoride/monoethylamine complex, (the hot-curing agent should be present in a proportion of 3.5 to 6.0% by weight of the resin). The solvent which was found to be particularly suitable, was dimethylformamide (DMF). This ensures an unusually long container life at room temperature and prevents the formation of agglomerates on the rollers over the entire zone of contact with the resin/curing agent solution. Presumably, the markedly low volatility of DMF contributes to this fact. It is probable that the complete coating of the filaments is favoured by this low volatility.

In practice, the time for the coating resin solution to flow between the individual filaments in the thread is extended because, analogously to the relatively difficult evaporation of the solvent, the viscosity only rises slowly. The quantitative proportion of the resin in the thread for example reached a total of 19% as a result of dipping in a solution of 35% solids content in dipping stations 33 to 40 and 48, whilst without dipping in dipping station 48 it reached a value of about 15%. The preferred object, depending on the starting material for the mesh is a resin uptake of 12 to 20%, but this figure can be reduced to 8% by mechanically increasing the tension during dipping.

I claim:

1. A flexible thread comprising a plurality of individual filaments twisted together to form said thread, each said filament being composed of a polymeric base material, a partially cured synthetic resin, a hot-curing catalyst for said resin, each filament being encased by and being imbedded in said synthetic resin and catalyst so that adjacent filaments are intimately bonded to one another, said partially cured synthetic resin being stable at room temperature and being capable of being fully cured by subsequent heat treatment, said flexible thread being capable of being stored in incorporated into fabric form, prior to said subsequent heating.

2. A thread according to claim 1, wherein the synthetic resin is curable at temperatures of from 160° to 210° C.

3. A thread according to claim 1 or 2, wherein the resin consists of an unmodified epoxy resin mixed with an epoxy resin incorporating a plasticiser.

4. A thread according to claim 3, wherein the catalyst is a modified dicyandiamide or a boron trifluoride/monoethylamine complex.

5. A thread according to claim 1 wherein the entire thread possesses a specifically qualitatively oriented proportion of synthetic resin in the direction from the thread core outwards.

6. A thread according to claim 1 wherein the entire thread is additionally encased in a synthetic resin layer.

7. A thread according to claim 1 wherein the synthetic resin and the polymer base material are matched to one another.

8. A thread according to claim 7 wherein the base material of the thread consists of polyester, polyamide, polyacrylonitride, aramide and/or glass.

9. A thread according to claim 8, wherein the base material comprises a mixture of polyester with polyacrylonitrile and optionally with nylon.

10. A process for the manufacture of a flexible thread of the type comprising a plurality of filamentary components twisted together, wherein the filamentary components of the thread are each imbedded in and encased in a partially cured synthetic resin and a heat-curable catalyst, said process comprising, providing a thread of a type wherein the filaments are twisted together to form said thread, providing a plurality of rollers in a dipping bath containing said resin, dipping said thread into said bath under conditions of little tension while training said thread about said rollers, concurrently driving said rollers at different speeds so as to subject said thread to alternate pulling and pushing forces, subsequently partially curing said resin.

11. A process according to claim 10 further comprising the step of loosening said filaments before dipping.

12. A process according to claim 11 wherein said loosening comprises repeatedly subjecting said thread to a bending operation prior to said dipping step.

13. A process according to claim 10, 11 or 12, further comprising subjecting said thread to heat treatment at temperatures of from 180° to 250° C. before dipping while concurrently working said thread then cooling said thread approximately to room temperature before dipping to fix the heat-shrinkage properties and improve the elongation properties.

14. A process according to claim 10 further comprising vertically leading the thread from said dipping bath.

15. A process according to claim 10 comprising adding a solvent to said resin and evaporating said solvent after said dipping bath.

16. A process according to claim 10, comprising adding a solvent to said resin and after leaving the dipping bath, only partially evaporating said solvent and subsequently passing said thread through a further dipping bath containing a second resin solution of thicker consistency than said other resin solution.

17. A process according to claim 15 or 16, wherein the partial curing of the synthetic resin is effected under increased thread tension.

18. A process according to claim 16, wherein between the first and second dipping process of the raw thread a partial curing of the synthetic resin takes place and after the second dipping process a complete curing of the resin coating applied in the second dipping process takes place, the resin coating being flexible.

19. A process according to claim 16, wherein the synthetic resin used is a mixture of unmodified and plasticised epoxy resins, the hot-curing catalyst used is modified dicyandiamide or a boron trifluoride/monoethylamine complex, the resin solvent is dimethylformamide.

20. Process according to claim 13 wherein said working comprises stretching said thread.

21. Process according to claim 13 wherein said working comprises shrinking said thread.

22. Process according to claim 13 wherein said working comprises maintaining said thread at its original length.

23. A process for the manufacture of flexible thread of the type comprising a plurality of filaments twisted together to form said thread, wherein said filaments each consist of a polymeric base material, said process comprising providing a synthetic resin, providing a hot-curing catalyst, providing a solvent compatible with said synthetic resin and said hot-curable catalyst, placing said synthetic resin, hot-curing catalyst, and solvent in a dipping bath, wherein said synthetic resin comprises a mixture of an unmodified epoxy resin and an epoxy resin incorporating a plasticiser, dipping said thread into said bath so that the innermost filaments thereof are reached and penetrated by the constituents of said bath, vaporizing said solvent under controlled time and temperature conditions thereby to partially cure said resin-catalyst mixture to form a thread which has the desired degree of stiffness and which is chemically stable and storable at room temperature but which is capable of being fully cured upon subsequent heating.

24. Process according to claim 23 comprising the further step of subsequently heating said thread to fully cure said resin-catalyst mixture.

25. Process as defined in claim 24 wherein said solvent comprises dimethylformamide.

26. Process according to claim 23 wherein said hot-curable catalyst comprises a modified dicyandiamide or a boron trifluoride/monoethylamine complex.

27. Process as defined in claim 23 comprising the step of subjecting the thread to an alternate pushing and pulling action concurrent with said dipping.

28. Process according to claim 23 wherein said dipping bath comprises a relatively large amount of epoxy resin incorporating a plasticiser to increase flexibility, permanent elasticity, and compressibility of the thread.

29. Process as defined in claim 23 further comprising the step of loosening said filaments prior to dipping.

* * * * *

UNITED STATES PATENT AND TRADEMARK OFFICE
CERTIFICATE OF CORRECTION

PATENT NO. : 4,250,702
DATED : 02/17/81
INVENTOR(S) : Rudolph Gundlach

It is certified that error appears in the above—identified patent and that said Letters Patent is hereby corrected as shown below:

Column 9, line 36 "fimaments" should be --filaments--;

Column 10, line 43 after "stored" delete "in" and substitute --or--.

Signed and Sealed this

Thirtieth Day of June 1981

[SEAL]

Attest:

RENE D. TEGTMEYER

*Attesting Officer*  *Acting Commissioner of Patents and Trademarks*